United States Patent
Katayama

(10) Patent No.: US 6,971,360 B2
(45) Date of Patent: Dec. 6, 2005

(54) KNOCKING AVOIDANCE CONTROL SYSTEM OF A FOUR-STROKE ENGINE FOR AN OUTBOARD MOTOR

(75) Inventor: Goichi Katayama, Shizuoka (JP)

(73) Assignee: Yamaha Marine Kabushiki Kaisha, (JP)

(*) Notice: Subject to any disclaimer, the term of this patent is extended or adjusted under 35 U.S.C. 154(b) by 0 days.

(21) Appl. No.: 10/715,320

(22) Filed: Nov. 17, 2003

(65) Prior Publication Data

US 2004/0099237 A1    May 27, 2004

(30) Foreign Application Priority Data

Nov. 15, 2002    (JP) .............................. 2002-331550

(51) Int. Cl.[7] .......................... F02B 77/08; F16F 15/03
(52) U.S. Cl. ..................... 123/192.1; 701/111
(58) Field of Search .................... 123/406.29, 90.17, 123/90.31, 192.1; 701/111

(56) References Cited

U.S. PATENT DOCUMENTS

| | | |
|---|---|---|
| 4,805,442 A | 2/1989 | Okumura et al. |
| 5,062,399 A | 11/1991 | Nagakura et al. |
| 5,125,382 A | 6/1992 | Kanno et al. |
| 5,365,908 A | 11/1994 | Takii et al. |
| 5,673,667 A | 10/1997 | Nakamura |
| 5,687,694 A | 11/1997 | Kanno |
| 5,738,074 A | 4/1998 | Nakamura et al. |
| 5,775,299 A | 7/1998 | Ito et al. |
| 5,778,857 A | 7/1998 | Nakamura et al. |
| 5,845,613 A | 12/1998 | Yoshikawa |
| 5,865,153 A | 2/1999 | Matsumoto |
| 6,067,956 A | 5/2000 | Motose et al. |
| 6,769,404 B2 * | 8/2004 | Aoyama et al. ........ 123/406.29 |

FOREIGN PATENT DOCUMENTS

| | | |
|---|---|---|
| JP | 09126107 | 5/1997 |
| JP | 11190236 | 7/1999 |

* cited by examiner

*Primary Examiner*—Henry C. Yuen
*Assistant Examiner*—Hyder Ali
(74) *Attorney, Agent, or Firm*—Knobbe Martens Olson & Bear LLP

(57) ABSTRACT

An outboard motor includes four-cycle engine for a marine drive, and more particularly a four-cycle engine for a marine drive that has a vertically extending camshaft. The four-cycle engine includes at least one pre-ignition or knock sensor. An electronic control unit adjusts ignition timing and intake camshaft timing to protect the engine during a pre-ignition condition while improving fuel efficiency and preserving high engine output.

12 Claims, 9 Drawing Sheets

KNOCKING AVOIDANCE CONTROL SYSTEM OF A FOUR-STROKE ENGINE FOR AN OUTBOARD MOTOR

PRIORITY INFORMATION

This application is based on and claims priority to Japanese Patent Application No. 2002-331550, filed Nov. 15, 2002, the entire contents of which is hereby expressly incorporated by reference.

BACKGROUND OF THE INVENTION

1. Field of the Invention

The present inventions generally relate to a four-cycle engine for a marine drive, and more particularly to a four-cycle engine for a marine drive that senses pre-ignition vibration and adjusts an ignition timing and a camshaft timing to promote high efficiency.

2. Description of the Related Art

Marine drives such as outboard motors include a marine propulsion device powered by an engine. The propulsion device typically is a propeller and is submerged when an associated watercraft rests on a body of water. The outboard motor can employ either a two-cycle engine or a four-cycle engine. Recently, however, many outboard motors have been offered with four-cycle engines because they provide better emissions control.

Typically, a four-cycle engine includes one or more intake and exhaust valves moving between an open position and a closed position within a cylinder head member. One or more camshafts can be provided to actuate the valves in a timed manner. When the intake valves are open, air is introduced into combustion chambers of the engine through the intake ports. When the exhaust valves are open, exhaust gases are discharged from the combustion chambers through the exhaust ports.

The camshafts typically extend vertically within the engine of an outboard motor. A crankshaft of the engine also extends vertically and drives the camshafts. The camshafts and the crankshaft can be provided with sprockets or pulleys around which a timing chain or belt is wound so that the crankshaft drives the camshafts through the timing chain or belt.

Some engine include pre-ignition or knock sensors to sense vibration in a combustion chamber and adjust an ignition timing to prevent harm from occurring to the engine. However, such knock sensing systems that simply adjust the ignition timing to prevent engine damage reduce engine efficiency and power when running on lower octane fuels.

SUMMARY OF THE INVENTION

An aspect of at least one of the inventions disclosed herein includes the realization that gains in fuel economy can be achieved by reducing the amount of air entering a combustion chamber as a means for suppressing engine knocking. For example, known engines use ignition timing retard to suppress engine knocking when such knocking is detected. However, such retardation of ignition timing results in less efficient combustion, thereby lowering fuel economy and increasing certain less desirable exhaust emissions. By reducing the amount of air entering the combustion chamber of the engine to suppress engine knocking, less fuel can be delivered to the combustion chamber thereby lowering fuel consumption during engine knock suppression.

A further advantage is achieved where both ignition timing and the air amount entering the combustion chamber are manipulated. For example, retarding ignition timing quickly reduces engine knocking. However, changing the flow of air into the combustion chamber of an engine can require more time, due in part to the fluid dynamics of air flow into an engine.

For example, the air flow velocities of air flowing into an internal combustion engine at normal operating speeds, can be quite high. Additionally, the air flow pulsates in accordance with the opening and closing of the intake valve. As such, the momentum and compressibility of the air flow become factors affecting the movement of the air through the induction system and into the combustion chamber. Thus, changing the flow of the air, and in particular, making fine adjustments to the air flow, through manipulation of the throttle valve, intake valve timing, or other parts of the induction system can require additional time. Thus, ignition timing and air amount manipulation can be used together to achieve the benefits of the fast effect of ignition timing retardation and the fuel saving and emissions reducing effects of air amount manipulation.

In accordance with at least one of the embodiments disclosed herein, a method is provided for adjusting valve timing based on the existence of a pre-ignition vibration within an engine being controlled by an electronic control unit which comprises a control module that is in electrical communication with a vibration sensor, the electronic control unit being adapted to control an ignition timing of an ignition source and to control a valve operation. The method comprises sensing a vibration from a pre-ignition within the engine and determining when the vibration exceeds a first predetermined vibration value, adjusting the ignition timing to a predetermined first value until the vibration is reduced to a vibration value below the first predetermined value, adjusting the valve operation to maintain the vibration value at a value below the first predetermined value.

In accordance with at least one of the embodiments disclosed herein, an internal combustion engine comprising an engine body, a movable member movable relative to the engine body. The engine body and the movable member together defining a combustion chamber. The engine body defines intake and exhaust ports communicating with the combustion chamber, an air induction system communicating with the combustion chamber through the intake port, an exhaust system communicating with the combustion chamber through the exhaust port, and an intake valve arranged to move between an open position and a closed position. An exhaust valve is arranged to move between an open position and a closed position. A camshaft is configured to actuate at least the intake valve. An ignition system is configured to ignite a mixture of fuel and air in the combustion chamber. A pre-ignition sensor is configured to sense a pre-ignition in the combustion chamber. A change mechanism is arranged to change an angular position of the camshaft. A control system is configured to adjust timing of the ignition system and control the change mechanism to change the angular position of the camshaft according to a sensed pre-ignition.

In accordance with at least one of the embodiments disclosed herein, an internal combustion engine comprising an engine body and a movable member movable relative to the engine body. The engine body and the movable member together define a combustion chamber. A controller is configured to control an ignition timing of an ignition source and to control a valve operation. The engine also includes means for sensing a vibration from a pre-ignition and determining when the vibration exceeds a predetermined vibration level, means for retarding the ignition timing to a predetermined value to reduce the vibration, means for adjusting the valve operation to reduce a quantity of air flowing into the engine body when the vibration exceeds the predetermined level, and means for advancing the ignition timing when the valve operation is adjusted to reduce the quantity of air.

For purposes of summarizing the invention, certain aspects, advantages and novel features of the invention have been described herein above. Of course, it is to be understood that not necessarily all advantages disclosed or taught herein may be achieved in accordance with any particular embodiment of the invention. Thus, the invention may be embodied or carried out in a manner that achieves or optimizes one advantage or group of advantages as disclosed or taught herein without necessarily achieving other advantages as may be disclosed, taught or suggested herein.

All of these aspects are intended to be within the scope of the invention herein disclosed. These aspects of the invention, as well as others, will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

The above-mentioned and other features of the inventions will now be described with reference to the drawings of the preferred embodiments of the present operational control device in the context of a personal watercraft. The illustrated embodiments of the operation control device are intended to illustrate, but not to limit, the invention. The drawings contain the following figures.

DETAILED DESCRIPTION OF THE PREFERRED EMBODIMENT

Figure 1:
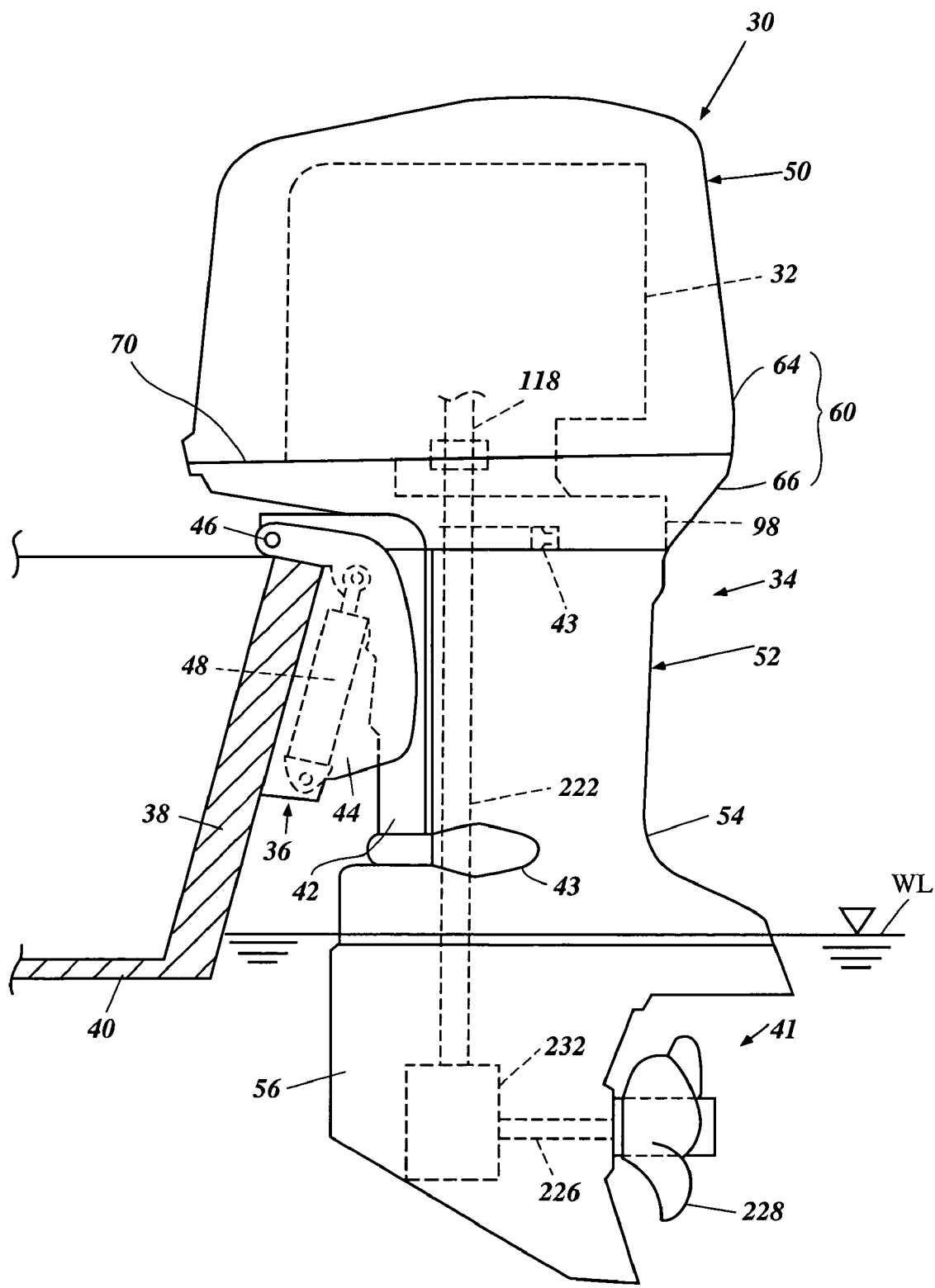
FIG. 1 is a side elevational view of an outboard motor configured in accordance with a preferred embodiment. An engine and drive train are illustrated in phantom.

With reference to FIGS. 1–4, an overall construction of an outboard motor 30 that employs an internal combustion engine 32 configured in accordance with certain features, aspects and advantages of the present embodiments is described below. The engine 32 has particular utility in the context of a marine drive, such as the outboard motor, and thus is described in the context of an outboard motor. The engine 32, however, can be used with other types of marine drives (i.e., inboard motors, inboard/outboard motors, jet drives, etc.) and also certain land vehicles. In any of these applications, the engine 32 can be oriented vertically or horizontally. Furthermore, the engine 32 can be used as a stationary engine for some applications as is apparent to those of ordinary skill in the art in light of the description herein.

The outboard motor 30 generally comprises a drive unit 34, a bracket assembly 36, and a marine propulsion device 41. The bracket assembly 36 supports the drive unit 34 on a transom 38 of an associated watercraft 40 and places the marine propulsion device 41 in a submerged position when the watercraft 40 rests on a surface of a body of water WL. The bracket assembly 36 preferably comprises a swivel bracket 42, a clamping bracket 44, a steering shaft and a pivot pin 46.

A steering shaft (not shown) extends through the swivel bracket 42 and is affixed to the drive unit 34 by top and bottom mount assemblies 43. The steering shaft is pivotally journaled for steering movement about a generally vertically extending steering axis defined within the swivel bracket 42.

The clamping bracket 44 comprises a pair of bracket arms that are spaced apart from each other and that are affixed to the watercraft transom 38. The pivot pin 46 completes a hinge coupling between the swivel bracket 42 and the clamping bracket 44. The pivot pin 46 extends through the bracket arms so that the clamping bracket 44 supports the swivel bracket 42 for pivotal movement about a generally horizontally extending tilt axis defined by the pivot pin 46. The drive unit 34 thus can be tilted or trimmed about the pivot pin 46.

As used through this description, the terms "forward," "forwardly" and "front" mean at or toward the side where the bracket assembly 36 is located, and the terms "rear," "reverse," "backwardly" and "rearwardly" mean at or toward the opposite side of the front side, unless indicated otherwise or otherwise readily apparent from the context use.

A hydraulic tilt and trim adjustment system 48 preferably is provided between the swivel bracket 42 and the clamping bracket 44 for tilt movement (raising or lowering) of the swivel bracket 42 and the drive unit 34 relative to the clamping bracket 44. Otherwise, the outboard motor 30 can have a manually operated system for tilting the drive unit 34. Typically, the term "tilt movement", when used in a broad sense, comprises both a tilt movement and a trim adjustment movement.

The illustrated drive unit 34 comprises a power head 50 and a housing unit 52. The housing unit 52 includes a driveshaft housing 54 and a lower unit 56. The power head 50 is disposed atop the drive unit 34 and includes the internal combustion engine 32 and a protective cowling assembly 60.

Figure 2:
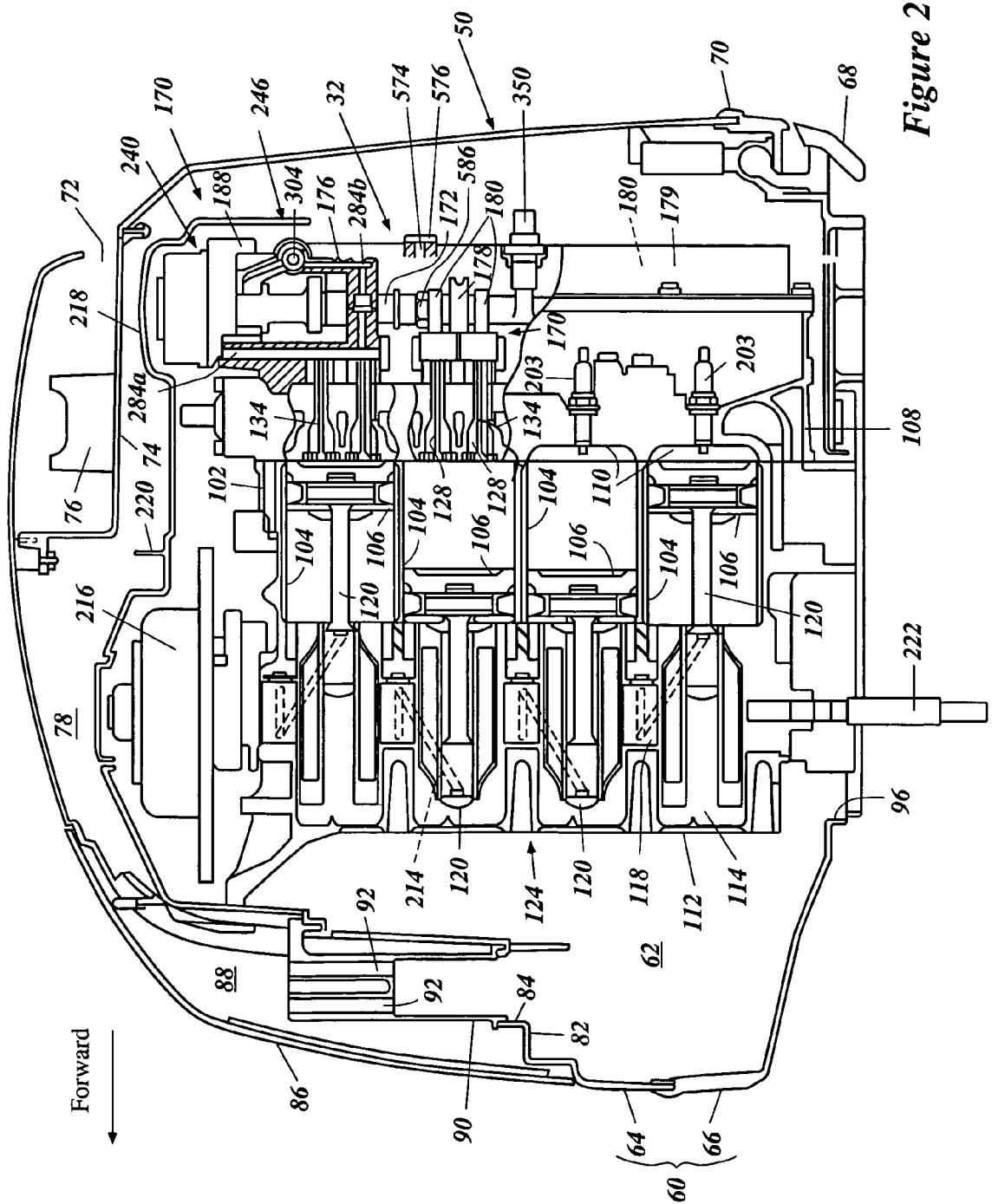
FIG. 2 is an enlarged partial sectional and port side elevational view of a power head of the outboard motor. A camshaft drive mechanism is omitted in this figure except for an intake camshaft sprocket.

Preferably the protective cowling 60 is made of plastic and defines a generally closed cavity 62 (FIG. 2) in which the engine 32 is disposed. That is, the cowling assembly 60 surrounds the engine 32. The protective cowling assembly 60 preferably comprises a top cowling member 64 and a bottom cowling member 66. The top cowling member 64 preferably is detachably affixed to the bottom cowling member 66 by a coupling mechanism 68 (FIG. 2). When the top cowling member 64 is detached, a user, operator, mechanic or repairperson can access the engine 32 for maintenance or for other purposes.

With reference to FIG. 2, the top cowling member 64 preferably has a rear intake opening 72 on its rear and top portion. A rear intake member 74 with a rear air duct 76 is affixed to the top cowling member 64. The rear intake member 74, together with the rear top portion of the top cowling member 64, forms a rear air intake space 78. The rear air duct 76 preferably is disposed to the starboard side of a central portion of the rear intake member 74.

The top cowling member 64 also defines a recessed portion 82 at a front end thereof. An opening 84 is defined along a portion of the recessed portion 82 on the starboard side. The opening 84 extends into the interior of the top cowling member 64. An outer shell 86 is disposed over the recessed portion 82 to define a front air intake space 88. A front air duct 90 is affixed to the recessed portion 82 of the top cowling member 64 and extends upward from the opening 84. In this manner, the air flow path into the closed cavity 62 can include an elevated entrance from the front air intake space 88. The air duct 90 preferably has a plurality of apertures 92, each of which preferably is cylindrical.

A front intake opening (not shown) preferably is defined between the recessed portion 82 of the top cowling member 82 and the outer shell 86 so that the front intake space 88 communicates with outside of the cowling assembly 60. Ambient air thus is drawn into the closed cavity 62 through the rear intake opening 72 or the front intake opening (not shown) and further through the air ducts 76, 90. Typically, the top cowling member 64 tapers in girth toward its top surface, which is in the general proximity of the air intake opening 72.

The bottom cowling member 66 preferably has an opening 96 (FIG. 2) through which an upper portion of an exhaust guide member 98 (FIG. 1) extends. The exhaust guide member 98 preferably is made of aluminum alloy and is affixed atop the driveshaft housing 54. The bottom cowling member 66 and the exhaust guide member 98 together generally form a tray. The engine 32 is placed onto this tray and is affixed to the exhaust guide member 98. The exhaust guide member 98 also has an exhaust passage through which burnt charges (e.g., exhaust gases) from the engine 32 are discharged.

Figure 3:
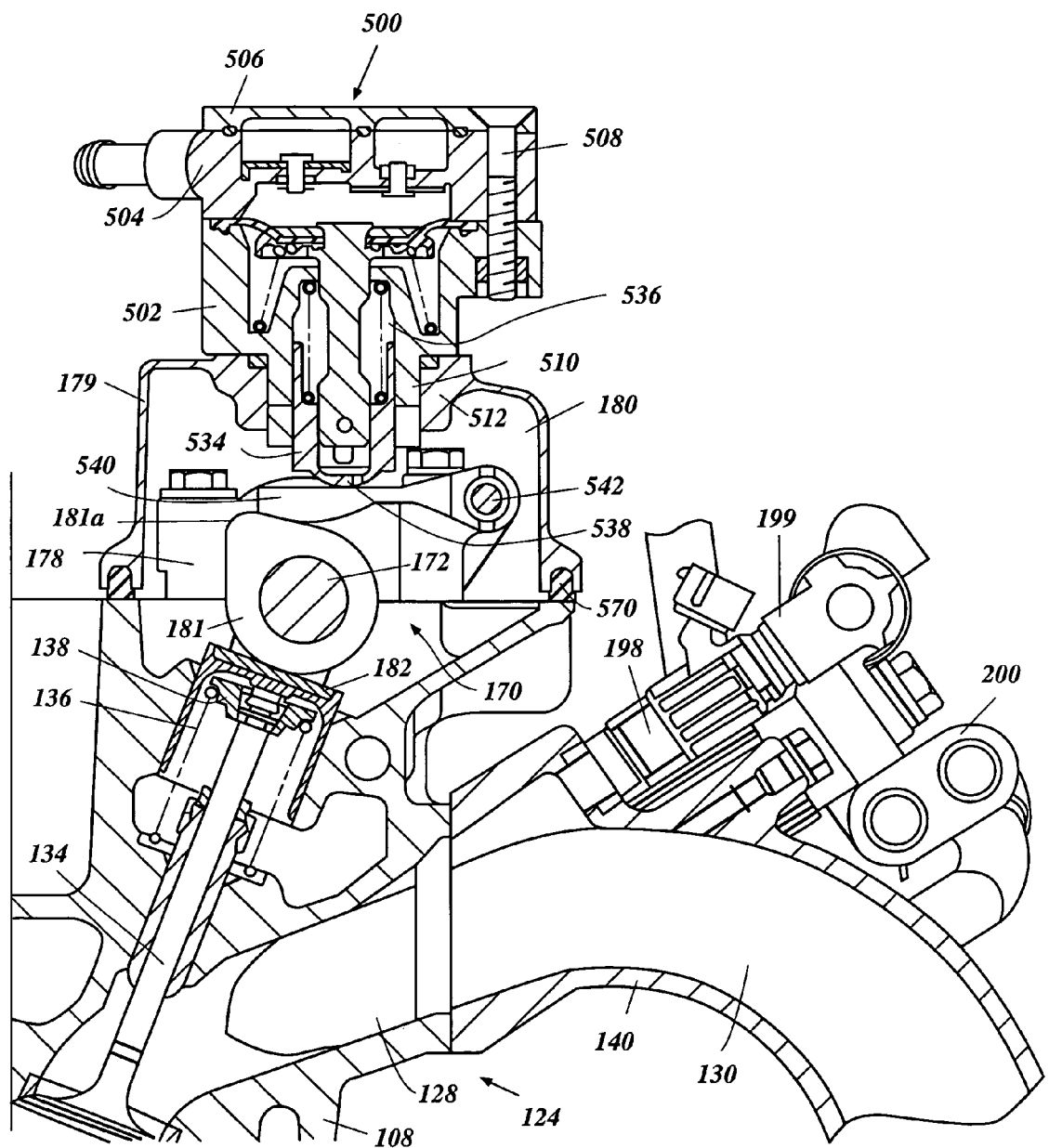
FIG. 3 is an enlarged, partial sectional and top plan view of the engine illustrating part of an intake system, part of a fuel injection system and a fuel pump assembly of the fuel injection system.

With reference to FIG. 2 and 3, the engine 32 in the illustrated embodiment preferably operates on a four-cycle combustion principle. The engine 32 has a cylinder block 102. The presently preferred cylinder block 102 defines four in-line cylinder bores 104 which extend generally horizontally and which are generally vertically spaced from one another. As used in this description, the term "horizontally" means that the subject portions, members or components extend generally in parallel to the water line WL when the associated watercraft 40 is substantially stationary with respect to the water line WL and when the drive unit 34 is not tilted and is placed in the position shown in FIG. 1. The term "vertically" in turn means that portions, members or components extend generally normal to those that extend horizontally.

This type of engine, however, merely exemplifies one type of engine on which various aspects and features of the present invention can be suitably used. Engines having other numbers of cylinders and having other cylinder arrangements (V, W, opposing, etc.) also can employ various features, aspects and advantages of the present invention. In addition, the engine can be formed with separate cylinder bodies rather than a number of cylinder bores formed in a cylinder block. Regardless of the particular construction, the engine preferably comprises an engine body that includes at least one cylinder bore 104.

moveable member, such as a reciprocating piston 106, moves relative to the cylinder block 102 in a suitable manner. One piston 106 reciprocates within each cylinder bore 104.

A cylinder head member 108 is affixed to one end of the cylinder block 102 to close one end of the cylinder bores 104. The cylinder head member 108, together with the associated pistons 106 and cylinder bores 104, preferably defines four combustion chambers 110. Of course, the number of combustion chambers can vary, as indicated above.

A crankcase member 112 closes the other end of the cylinder bores 104 and, together with the cylinder block 102, defines a crankcase chamber 114. A crankshaft or output shaft 118 extends generally vertically through the crankcase chamber 114 and can be journaled for rotation by several bearing blocks (not shown). Connecting rods 120 couple the crankshaft 118 with the respective pistons 106 in any suitable manner. Thus, the crankshaft 118 can rotate with the reciprocal movement of the pistons 106.

Preferably, the crankcase member 112 is located at the forward-most position of the engine 32, with the cylinder block 102 and the cylinder head member 108 being disposed rearward from the crankcase member 112. Generally, the cylinder block 102 (or individual cylinder bodies), the cylinder head member 108, and the crankcase member 112 together define an engine body 124. Preferably, at least these major engine portions 102, 108, 112 are made of an aluminum alloy. The aluminum alloy advantageously increases strength over cast iron while decreasing the weight of the engine body 124.

The engine 32 also comprises an air induction system or device (not shown). The air induction system draws air from within the cavity 62 to the combustion chambers 110. The air induction system preferably comprises eight intake ports 128, four intake passages 130 and a single plenum chamber (not shown). In the illustrated arrangement, one intake port 128 is allotted to each combustion chamber 110. Each intake port 128 branches into two passages leading to two intake valve seats. Additionally, each intake port 128 communicates with an intake passage 130.

The intake ports 128 are defined in the cylinder head member 108. Intake valves 134 are slidably disposed at valve seats defined by the bifurcated intake ports 128 within the cylinder head member 108 to move between an open position and a closed position. As such, the valves 134 act to open and close the ports 128 to control the flow of air into the combustion chamber 110.

Biasing members, such as springs 136 (FIGS. 3 and 4), are used to bias the intake valves 134 toward the respective closed positions by acting against a mounting boss formed on the illustrated cylinder head member 108 and a corresponding retainer 138 that is affixed to each of the valves 134. When each intake valve 134 is in the open position, the intake passage 130 that is associated with the intake port 128 communicates with the associated combustion chamber 110.

With reference to FIG. 3, an intake manifold 140, a throttle body (not shown) and an intake runner (not shown), preferably defines each intake passage 130. The intake manifold 140 and the throttle body preferably are made of aluminum alloy. The intake runner preferably is made of plastic. A portion of the illustrated intake runner extends forwardly alongside of and to the front of the crankcase member 112.

With continued reference to FIG. 3, the respective portions of the intake runners, together with a plenum chamber member, define the plenum chamber. Preferably, the plenum chamber member also is made of plastic.

The plenum chamber comprises an air inlet (not shown). The air in the cavity 62 is drawn into the plenum chamber through the air inlet. The air is then passed through intake passages 130, the throttle body and the intake manifold 140. Preferably, the plenum chamber is configured to attenuate noise generated by the flow of air into the respective combustion chambers 110, and thus act as an "intake silencer."

Each illustrated throttle body 142 includes a butterfly type throttle valve (not shown) journaled for pivotal movement about an axis defined by a generally vertically extending valve shaft (not shown). Each valve shaft can be coupled with the other valve shafts to allow simultaneous movement. The valve shaft is operable by the operator through an appropriate conventional throttle valve linkage and a throttle lever connected to the end of the linkage. The throttle valves are movable between an open position and a closed position to meter or regulate an amount of air flowing through the respective air intake passages 130. Normally, the greater the opening degree, the higher the rate of airflow and the higher the power output of the engine.

In order to bring the engine 32 to idle speed and to maintain this speed, the throttle valves generally are substantially closed. Preferably, the valves are not fully closed in the idle position so as to produce a more stable idle speed and to prevent sticking of the throttle valves in the closed position. As used through the description, the term "idle speed" generally means a low engine speed that achieved when the throttle valves are closed but also includes a state such that the valves are slightly open to allow a relatively small amount of air to flow through the intake passages 130.

The air induction system preferably includes an auxiliary air device (AAD) (not shown) that bypasses the throttle valves and extends from the plenum chamber to the respective intake passages 130 downstream of the throttle valves. Auxiliary air, primarily idle air, can be delivered to the combustion chambers 110 through the AAD when the throttle valves are placed in a substantially closed or closed position.

The AAD preferably comprises an auxiliary air passage, an auxiliary valve and an auxiliary valve actuator. The auxiliary air passage is branched off to the respective intake passages 130. The auxiliary valve controls flow through the auxiliary air passage such that the amount of air flow can be more precisely controlled. Preferably, the auxiliary valve is a needle valve that can move between an open position and a closed position, which closes the auxiliary air passage. The auxiliary valve actuator actuates the auxiliary valve to meter or adjust an amount of the auxiliary air.

Figure 5:
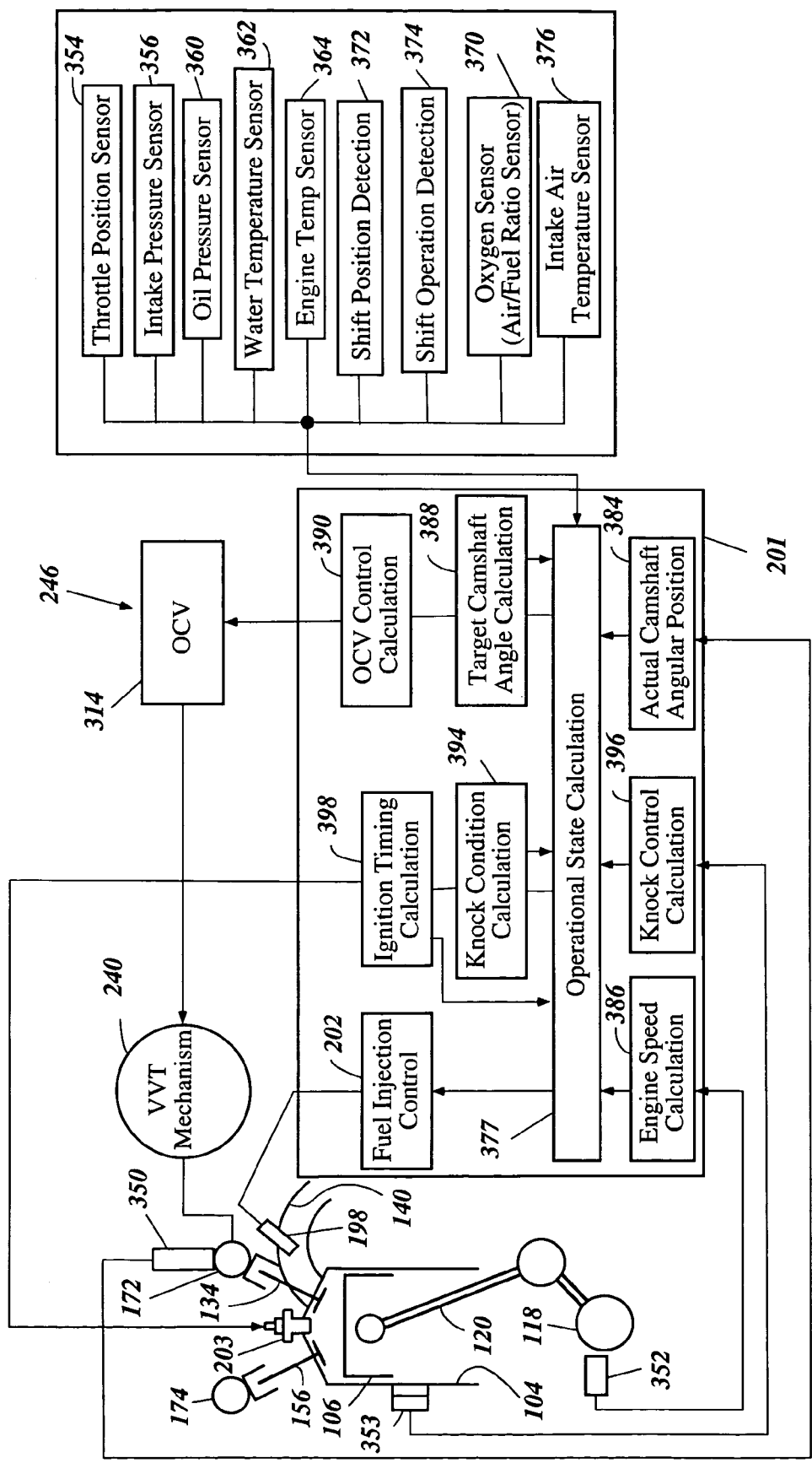
FIG. 5 is a schematic view of a control system of the VVT mechanism.

The engine 32 also comprises an exhaust system that guides burnt charges, i.e., exhaust gases, to a location outside of the outboard motor 30. Each cylinder bore 104 preferably has two exhaust ports (not shown) defined in the cylinder head member 108. The exhaust ports can be selectively opened and closed by exhaust valves 156 (FIG. 5). The construction of each exhaust valve 156 and the arrangement of the exhaust valves are substantially the same as the intake valves 134 and the arrangement thereof, respectively.

An exhaust manifold (not shown) preferably is disposed next to the exhaust ports (not shown) and extends generally vertically. The exhaust manifold communicates with the combustion chambers 110 through the exhaust ports to collect exhaust gases therefrom. The exhaust manifold is coupled with the exhaust passage of the exhaust guide member 98. When the exhaust ports are opened, the combustion chambers 110 communicate with the exhaust passage through the exhaust manifold.

Figure 4:
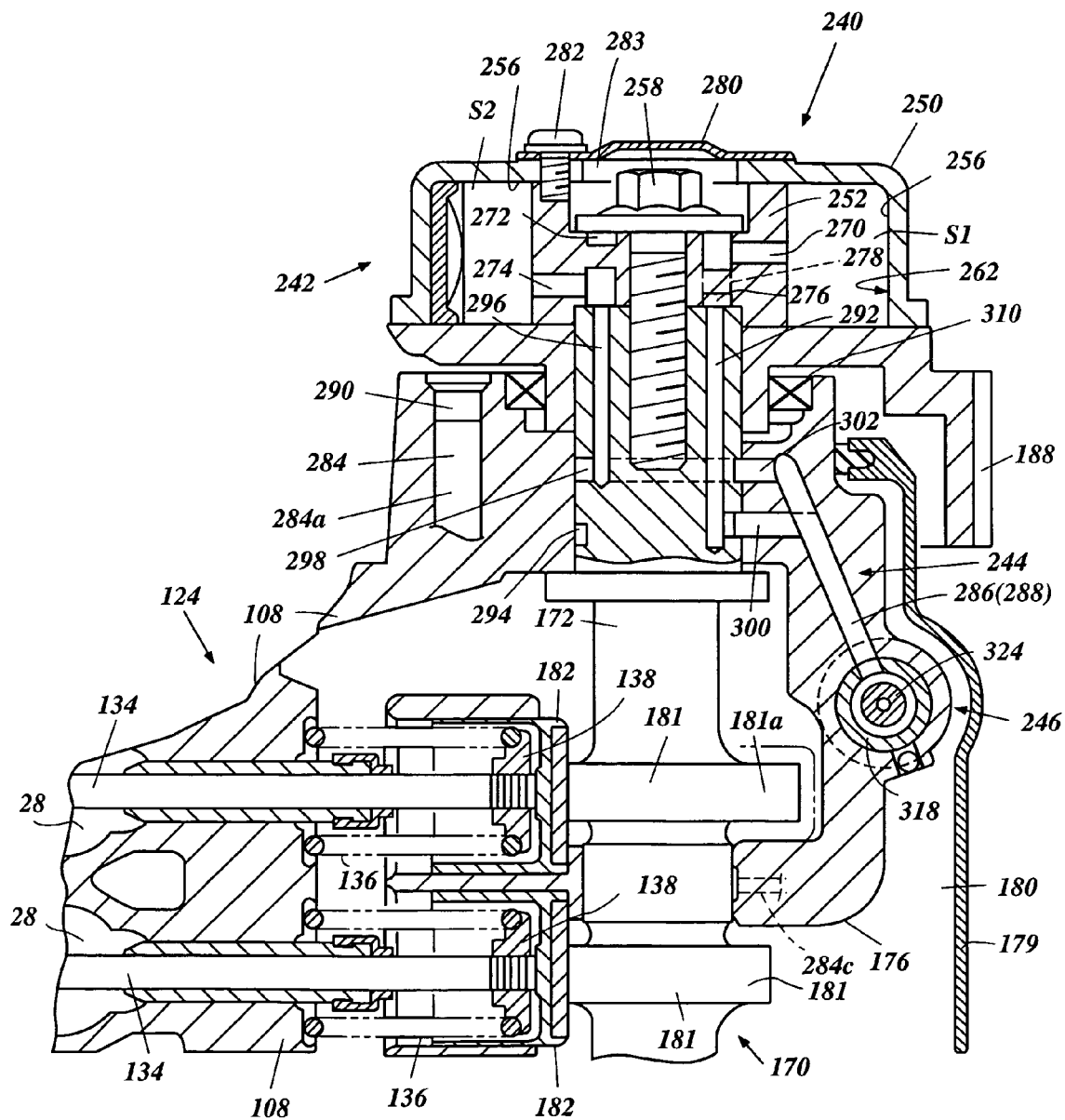
FIG. 4 is an enlarged, partial sectional and side elevational view of the engine illustrating a variable valve timing (VVT) mechanism thereof.

With particular reference to FIGS. 2, 3, and 4, a valve cam mechanism or valve actuator 170 preferably is provided for actuating the intake valves 134 and the exhaust valves 156. In the illustrated arrangement, the valve cam mechanism 170 includes an intake camshaft 172 and an exhaust camshaft 174 both extending generally vertically and journaled for rotation relative to the cylinder head member 108. In the illustrated arrangement, bearing caps 176, 178 (FIG. 2) journal the intake camshaft 172 and the exhaust camshaft with the cylinder head member 108.

A camshaft cover member 179 is affixed to the cylinder head member 108 by bolts (not shown) via a seal member 570 made of, for example, rubber to define a pair of camshaft chambers 180 together with the cylinder head member 108. The seal member 570 not only seals but also prevents the camshaft cover member 179 from vibrating. At least a portion of the camshaft cover member 179 abuts the cylinder head member 108 without interposing the seal member 570. This is advantageous because the camshaft cover member 179 is accurately positioned relative to the cylinder head member 108. Each camshaft is enclosed within each camshaft chamber 180. Alternatively, separate camshaft cover members can replace the single cover member 180 to separately enclose the camshafts.

The intake camshaft 172 and the exhaust camshaft 174 as shown in FIG. 4, each have a plurality of cams 181 associated with the respective valves 134, 156. Each cam 181 defines a cam lobe 181a configured to push valve lifters 182 that are affixed to the respective ends of the intake valves 134 and exhaust valves 156 in any suitable manner. The cam lobes 181a repeatedly push the valve lifters 182 in a timed manner, which is in proportion to the engine speed. The movement of the lifters 182 generally is timed by the rotation of the camshafts 172, 174 to actuate the intake valves 134 and the exhaust valves 156.

As shown in FIG. 4, in the illustrated arrangement, a top end of the camshaft cover member 179 is nested between an inner surface of the sprocket 188 and an outer surface of a top end of the cylinder block 108. Thus, the camshaft cover member 179 is attached to or detached from the intake camshaft 172 with the sprocket 188 removed. This arrangement allows the total height of the engine 32 to be shorter.

With reference to FIG. 3, a camshaft drive mechanism 186 drives the valve cam mechanism 170. The intake camshaft 172 and the exhaust 174 camshaft include an intake driven sprocket 188 positioned atop the intake camshaft 172 and an exhaust driven sprocket (not shown) positioned atop the exhaust camshaft 174. The crankshaft 118 has a drive sprocket (not shown) positioned at an upper portion thereof. Of course, other locations of the sprockets also can be used.

A timing chain or belt (not shown) is wound around the driven sprockets and the drive sprocket. The crankshaft 118 thus drives the respective intake camshaft 172 and exhaust camshaft 174 through the timing chain in the timed relationship. Because the intake camshaft 172 and the exhaust camshaft 174 must rotate at half of the speed of the rotation of the crankshaft 118 in the four-cycle combustion principle, a diameter of the driven intake sprocket 188 and the exhaust sprocket is twice as large as a diameter of the drive sprocket.

With reference to FIG. 3, the engine 32 preferably has a port or manifold fuel injection system. The fuel injection system preferably comprises four fuel injectors 198 with one fuel injector allotted for each of the respective combustion chambers 110 through suitable fuel conduits. Each fuel injector 198 preferably has an injection nozzle directed toward the associated intake passage 130 adjacent to the intake ports 128. The fuel injectors 198 preferably are mounted on a fuel rail 199. Preferably, the fuel rail 199 extends generally vertically and is mounted on the intake manifolds 140. The fuel rail 199 also defines a portion of the fuel conduits.

A heat exchanger 200 preferably is provided to cool the fuel and extends parallel to the fuel rail 199. The heat exchanger 200 preferably comprises a pair of fluid pipes, one of which defines part of the fuel conduits and the other defines a water passage through which cooling water can flow.

The illustrated fuel injection system additionally comprises a fuel pump assembly 500 that is actuated by the intake camshaft 172. The fuel pump assembly 500 is mounted on the camshaft cover member 179 and is disposed adjacent to the intake cam 181 that actuates the intake valve 134 associated with the combustion chamber 110 positioned second from the bottom.

The fuel pump assembly 500 preferably comprises a bottom housing member 502, a middle housing member 504 and a top housing member 506. The housing members 502, 504, 506 are coupled together by bolts 508. The bottom housing member 502 forms a projection 510. The camshaft cover member 179 defines an opening at a support portion 512 thereof and the projection 510 is fitted into the opening so that the fuel pump assembly 500 is mounted on the cover member 179. Fasteners such as bolts can fix the pump assembly 500 to the cover member 179.

An arm member 540 is journaled on a support shaft 542 for pivotal movement about an axis of the shaft 542. The support shaft 542 is affixed to the bearing cap 178. A lowermost end 538 of a slider 534 is biased against a top surface of the arm member 540 by a spring 536. The arm member is thereby biased against the cam 181. The cam 181 thus lifts the slider 534 upwardly when the cam lobe 181a meets the arm member 540.

The fuel injectors 198 spray fuel into the intake passages 130 under control of an ECU 201 (FIG. 5) which preferably is mounted on the engine body 124 at an appropriate location. The ECU 201 controls both the start timing and the duration of the fuel injection cycle of the fuel injectors 198 so that the nozzles spray a desired amount of the fuel for each combustion cycle. The fuel injection controller within the ECU 201 is illustrated in FIG. 5 with reference numeral 202 and is described below. Of course, the fuel injectors 198 can be disposed for direct cylinder injection or carburetors can replace or accompany the fuel injectors 198.

With reference to FIG. 2, the engine 32 further comprises an ignition or firing system. Each combustion chamber 110 is provided with spark plug 203 that is connected to the ECU 201 (FIG. 5) through an igniter so that ignition timing is also controlled by the ECU 201. Each spark plug 203 has electrodes that are exposed into the associated combustion chamber and are spaced apart from each other with a small gap. The spark plugs 203 generate a spark between the electrodes to ignite an air/fuel charge in the combustion chamber 110 at selected ignition timing under control of the ECU 201.

In the illustrated engine 32, the pistons 106 reciprocate between top dead center and bottom dead center. When the crankshaft 118 makes two rotations, the pistons 106 generally move from the top dead center to the bottom dead center (the intake stroke), from the bottom dead center to the top dead center (the compression stroke), from the top dead center to the bottom dead center (the power stroke) and from the bottom dead center to the top dead center (the exhaust stroke). During the four strokes of the pistons 106, the camshafts 172, 174 make one rotation and actuate the intake valves 134 and the exhaust valves 156 (FIG. 5) to open the intake ports 128 during the intake stroke and to open exhaust ports during the exhaust stroke, respectively.

Generally, during the intake stroke, air is drawn into the combustion chambers 110 through the air intake passages 130 and fuel is injected into the intake passages 130 by the fuel injectors 198. The air and the fuel thus are mixed to form the air/fuel charge in the combustion chambers 110. Slightly before or during the power stroke, the respective spark plugs 203 ignite the compressed air/fuel charge in the respective combustion chambers 110. The air/fuel charge thus rapidly burns during the power stroke to move the pistons 106. The burnt charge, i.e., exhaust gases, then are discharged from the combustion chambers 110 during the exhaust stroke.

During engine operation, heat builds in the engine body 124. The illustrated engine 32 thus includes a cooling system to cool the engine body 124. The outboard motor 30 preferably employs an open-loop type water cooling system that introduces cooling water from the body of water surrounding the motor 30 and then discharges the water to the body of water. The cooling system includes one or more water jackets defined within the engine body 124 through which the water travels to remove heat from the engine body 124. The foregoing heat exchanger 200 can use part of the water flowing through the cooling system.

The engine 32 also preferably includes a lubrication system. A closed-loop type system preferably is employed in the illustrated embodiment. The lubrication system comprises a lubricant tank defining a reservoir, which preferably is positioned within the driveshaft housing 54. An oil pump (not shown) is provided at a desired location, such as atop the driveshaft housing 54, to pressurize the lubricant oil in the reservoir and to pass the lubricant oil through a suction pipe toward certain engine portions, which desirably are lubricated, through lubricant delivery passages. The engine portions that need lubrication include, for example, but not limited to the crankshaft bearings (not shown), the connecting rods 120 and the pistons 106. Portions 214 of the delivery passages (FIG. 2) can be defined in the crankshaft 118. Lubricant return passages (not shown) also are provided to return the oil to the lubricant tank for recirculation.

A flywheel assembly 216 (FIG. 2) preferably is positioned at an upper end of the crankshaft 118 and is mounted for rotation with the crankshaft 118. The flywheel assembly 216 comprises a flywheel magneto or AC generator that supplies electric power to various electrical components such as the fuel injection system, the ignition system and the ECU 201 (FIG. 5). A protective cover 218, which preferably is made of plastic, extends over majority of the top surface of the engine 32 and preferably covers the portion that includes the fly wheel assembly 216 and the camshaft drive mechanism 186.

With reference to FIG. 1, the driveshaft housing 54 depends from the power head 50 to support a driveshaft 222 which is coupled with the crankshaft 118 and which extends generally vertically through the driveshaft housing 54. The driveshaft 222 is journaled for rotation and is driven by the crankshaft 118. The driveshaft housing 54 preferably defines an internal section of the exhaust system that leads the majority of exhaust gases to the lower unit 56. An idle discharge section is branched off from the internal section to discharge idle exhaust gases directly out to the atmosphere through a discharge port that is formed on a rear surface of the driveshaft housing 54 in idle speed of the engine 32. The driveshaft 222 preferably drives the oil pump.

With continued reference to FIG. 1, the lower unit 56 depends from the driveshaft housing 54 and supports a propulsion shaft 226 that is driven by the driveshaft 222. The propulsion shaft 226 extends generally horizontally through the lower unit 56 and is journaled for rotation. The propulsion device 41 is attached to the propulsion shaft 226. In the illustrated arrangement, the propulsion device includes a propeller 228 that is affixed to an outer end of the propulsion shaft 226. The propulsion device, however, can take the form of a dual counter-rotating system, a hydrodynamic jet, or any of a number of other suitable propulsion devices.

A transmission 232 preferably is provided between the driveshaft 222 and the propulsion shaft 226, which lie generally normal to each other (i.e., at a 90° shaft angle) to couple together the two shafts 222, 226 by bevel gears. The transmission 232 includes a switchover mechanism (not shown) that is configured to change a rotational direction of the propeller 228 between forward, neutral or reverse. The switchover mechanism typically comprises a dog clutch and a shift unit that operates the dog clutch. At the forward and reverse positions, which are propulsion positions, the propeller 228 propels the watercraft 40 forward and backward, respectively. At the neutral position, which is a-non-propulsion position, the propeller 228 does not propel the watercraft 40 because the propulsion shaft 226 is disconnected from the driveshaft 222.

Preferably, the switchover mechanism is interconnected with the throttle valve linkage. A single control lever, which is the foregoing throttle lever, can be connected with not only the throttle valve but also the switchover mechanism to control both of them in an interrelationship such that the throttle valve is always closed (or almost closed) when the transmission is placed in the neutral position by the switchover mechanism, except for an engine racing operation. The throttle linkage can be released from the switchover mechanism for the racing operation.

The lower unit 56 also defines an internal section of the exhaust system that is connected with the internal section of the driveshaft housing 54. At engine speeds above idle, the exhaust gases generally are discharged to the body of water surrounding the outboard motor 30 through the internal sections and then through a discharge section defined within the hub of the propeller 228. Preferably, the outboard motor 30 also includes an idle exhaust discharge (not shown) configured to discharge exhaust gases to the atmosphere at a position above the waterline WL at idle engine speeds.

With reference to FIGS. 2 and 4 a VVT mechanism 240 is described below.

The VVT mechanism 240 preferably is configured to adjust the angular position of the intake camshaft 172 relative to the intake driven sprocket 188 between two limits, i.e., a fully advanced angular position and a fully retarded angular position. At the fully advanced angular position, the intake camshaft 172 opens and closes the intake valves 134 at a most advanced timing. In contrast, at the fully retarded angular position, the intake camshaft 172 opens and closes the intake valves 134 at a most retarded timing.

The VVT mechanism 240 preferably is hydraulically operated and thus comprises an adjusting section 242, a fluid supply section 244 and a control section 246. The adjusting section 242 sets the intake camshaft 172 to an angular position in response to a volume of working fluid that is allotted to two spaces of the adjusting section 242. The fluid supply section 244 preferably supplies a portion of the lubricant, which is used primarily for the lubrication system, to the adjusting section 242 as the working fluid. The control section 246 selects the rate or amount of the fluid directed to the adjusting section 242 under control of the ECU 201 (FIG. 5).

With reference to FIG. 4, the adjusting section 242 preferably includes an outer housing 250 and an inner rotor 252. The outer housing 250 is affixed to the intake driven sprocket 188 by three bolts (not shown) and preferably forms three hydraulic chambers 256, two of which are shown in FIG. 4. Any other suitable fastening technique and any suitable number of chambers 256 can be used.

The inner rotor 252 is affixed atop the intake camshaft 172 by a bolt 258 and has three vanes (not shown) extending into the respective chambers 256 of the housing 250. The number of vanes can be varied and the inner rotor 252 can be attached to the camshaft 172 in any suitable manners.

The vanes preferably extend radially and are spaced apart from each other with an angle of about 120 degrees. The two sides of the vane together with walls 262 of each chamber 256, define a first space S1 and a second space S2, respectively. Seal members (not shown) carried by the respective vanes abuts an inner surface of the housing 250 and thereby substantially seal the first and second spaces S1, S2 from each other.

The respective first spaces S1 communicate with one another through respective pathways 270 and a passage 272 that is formed on an upper surface of the rotor 252 and extends partially around the bolt 258. The respective second spaces S2 communicate with one another through respective pathways 274 and a passage 276 which is formed on a lower surface of the rotor 252 and extends partially around the bolt 258. The passages 272, 276 generally are configured as an incomplete circular shape and can be offset from one another (e.g., a 60 degree offset may be used).

A pathway 278 extends from the passage 272 to a bottom portion of the rotor 252 between the ends of the passage 276. A cover member 280 preferably is affixed to the outer housing 250 by at least one screw 282 to cover the bolt 258. The cover member 280 preferably is made of rubber, synthetic resin or sheet metal and can be fitted into an aperture 283 without using the screws 282. The passages 272, 276 allow fluid communication with the respective pathways 270, 274, 278 during rotation of the camshaft 172.

With reference to FIGS. 2 and 4, the fluid supply section 244 preferably includes a supply passage 284 and two delivery passages 286, 288. The supply passage 284 and the delivery passages 286, 288 communicate with one another through the control section 246. The supply passage 284 preferably has a passage portion 284a defined in the cylinder head member 108 and a passage portion 284b (FIG. 2) defined in the bearing cap 176. The passage portion 284a is connected to the lubrication system, while the passage portion 284b is connected to the control section 246. Thus, the lubricant oil of the lubrication system is supplied to the control section 246 through the fluid supply passage 284.

The supply passage 284 communicates with the lubrication system so that a portion of the lubricant oil is supplied to the VVT mechanism 240 as working fluid through the passage portions 284a, 284b. Because a drilling process in the illustrated embodiment forms the passage portion 284a, a closure member 290 closes one end of the passage portion 284a. The passage portion 284b is branched off to a camshaft lubrication passage 284c (FIG. 4) which delivers lubricant for lubrication of a journal of the camshaft 172.

The delivery passages 286, 288 preferably are defined in a top portion of the camshaft 172 and the bearing cap 176. A portion of the delivery passage 286 formed in the camshaft 172 includes a pathway 292 that extends generally vertically and that communicates with the pathway 278 that communicates with the passage 272 of the first space S1. The pathway 292 also communicates with a passage 294 that is formed as a recess in the outer surface of the camshaft 172.

A portion of the delivery passage 288 formed in the camshaft 172, in turn, includes a pathway 296 that extends generally vertically and communicates with the passage 276 of the second space S2. The pathway 296 also communicates with a passage 298 that is formed as a recess in the outer surface of the camshaft 172.

A portion of the delivery passage 286 formed in the bearing cap 176 includes a pathway 300 that extends generally vertically and generally horizontally to communicate with the passage 294. Similarly, a portion of the delivery passage 288 formed in the bearing cap 176 includes a pathway 302 that extends generally vertically and generally horizontally to communicate with the passage 298. The other ends of the pathways 300, 302 communicate with a common chamber 304 (FIG. 2) formed in the control section 246.

A seal member 310 (FIG. 4) is disposed between the cylinder head member 108, the camshaft 172 and the bearing cap 176 to inhibit the lubricant from leaking out. It should be noted that FIG. 4 illustrates the delivery passages 286, 288 in a schematic fashion. The passages 286, 288 do not merge together.

A rod 324 extends into the common chamber 304 from the actuator and is axially movable therein. An actuator, i.e., solenoid, (not shown) actuates the rod 324 under control of the ECU 201 (FIG. 5) so that the rod 324 can take any position in the chamber 304. More specifically, the solenoid pushes the rod 324 toward a position in compliance with commands of the ECU 201. If a certain position designated by the ECU 201 is closer to the solenoid than a current position, then the solenoid does not actuate the rod 324 and a coil spring (not shown) pushes the rod 324 back to the desired position. Alternatively, the solenoid can be configured to pull the rod 324 back to the position.

In one mode of operation, for example, the working fluid is fed to the common chamber 304 of a cylinder 318. Thus, the common chamber 304 has a positive pressure. To move the camshaft 172 in a first direction relative to the input sprocket 188, the common chamber 304 is linked with the delivery passage 286 while the other of the delivery passage 288 is linked to a drain (not shown). Thus, pressurized fluid will flow into the first space S1 while fluid will be displaced from the second space S2. The displaced fluid flows through the passage 334 and to the drain and thereby returns to the lubrication system. Once the desired movement has occurred, the rod 324 is returned to a neutral position in which the common chamber 304 is no longer communicating with either of the delivery passages 286, 288. Additionally, in the neutral position, neither of the delivery passages 286, 288 communicates with the drain in one particularly advantageous arrangement. Of course, by varying the placement and size of the seals, a constant flow can be produced from supply to drain while the rod 324 is in a neutral position. Also, a constant flow into the delivery lines also can be constructed. In the illustrated arrangement, however, no flow preferably occurs with the system in a neutral position. With reference to FIG. 2, in the illustrated arrangement, the camshaft cover member 179 preferably defines an access opening 574 below the VVT mechanism 240 and above the fuel pump assembly 500. Preferably, the opening 574 is disposed above the top end 70 of the bottom cowling member 66. A closure member 576 is detachably affixed to a mount portion 578 of the camshaft cover member 179 to close the opening 574. The opening 574 preferably has a size through which a tool such as, for example, a wrench can pass through. The intake camshaft 172 preferably forms a hexagonal portion 586 at which the wrench is engageable.

With the closure member 576 removed, the user, operator, repairperson or mechanic can insert the wrench through the slot 574. The wrench is engaged with the hexagonal portion 586 of the camshaft 172 to fix the camshaft 172 (i.e., to prevent the camshaft 172 from rotating).

The repairperson, for example, thus can easily disassemble the sprocket 188 from the camshaft 172 or assemble the sprocket 188 thereto for maintenance service or for other purposes. Because the drain oil accumulated within the camshaft chamber 180 does not spill out, the engine 32 is less likely to be stained by the oil and the repairperson does not need to pay special attention to prevent a large oil spill.

Because the top end of the camshaft cover member 179 is nested in the sprocket 188 in the arrangement, the illustrated sprocket 188 should be disassembled from the camshaft 172 before the cover member 179 is removed. Similarly, in this situation, the wrench inserted through the slot 574 to prevent the camshaft from rotating. The repairperson thus can work easily without the need for a special test for preventing the timing chain or belt 194 (FIG. 3) from moving or preventing the vanes 260 from rotating. Accordingly, the amount of labor needed can be reduced.

In addition, no large change in configuration on the camshaft or on components around the camshaft is necessary and an ordinary tool such as the wrench can be used. Thus, the outboard motor does not need to provide a large space for a special construction and does not require additional labor for the maintenance service.

Other polygon shaped portions can replace the hexagonal portion 586 of the camshaft 172. For example, a triangular shape or a rectangular shape can be applied as the polygon shape.

In addition, the access opening 574 can be in the form of, for example, a slot, a circular, or a rectangular configuration.

With reference to FIG. 5, an ignition timing and a valve timing control system of the VVT mechanism 40 using the ECU 201 is described below.

FIG. 5 schematically illustrates the engine 32. The illustrated ECU 201 adjusts the valve timing of the intake valves 134 by changing the angular positions of the intake camshaft 172 relative to the sprocket 188 through the VVT mechanism 40. The ECU 201 also controls the fuel injectors 198 using the fuel injection control unit 202 and the ignition timing of the spark plugs 203 using the ignition timing calculation unit 398. An oil control valve (OCV) controls the oil used to hydraulically move the VVT mechanism 40 according to the ECU 201. The ECU 201 is connected to the OCV 314, the control section 246 of the VVT mechanism 40, the fuel injectors 198, and the spark plugs 203 through control signal lines.

In order to control the VVT mechanism 40, the fuel injectors 198, and the spark plugs 203 the ECU 201 can employ various sensors, which sense operational conditions of the engine 32 and/or the outboard motor 30. In the present system, the ECU 201 uses a camshaft angle position sensor 350, a crankshaft angle position sensor 352, a knock sensor 353, a throttle position sensor (or throttle valve opening degree sensor) 354 and an intake pressure sensor 356. The ECU 201 is connected to the sensors 350, 352, 353, 354, 356 through sensor signal lines.

With reference to FIGS. 2 and 5, the camshaft angle position sensor 350 preferably is associated with the intake camshaft 172 to sense an angular position of the intake camshaft 172 and sends a camshaft angle position signal to the ECU 201 through the signal line.

The camshaft position sensor 350 preferably is positioned adjacent to a portion of the camshaft 172 located between the second and third cylinders of the engine 32. That is, the sensor 350 is placed below the housing section 316 of the OCV 314 of the VVT mechanism 240, more specifically, below the opening 574, and above the fuel pump assembly 500. The sensor 350 preferably is located above the top end 70 of the bottom cowling member 66.

The positioning of the camshaft angle position sensor 350 is advantageous because the user, operator, mechanic, or repairperson can easily access the sensor 350 for maintenance or for other purposes by merely detaching the upper cowling member 64. In the illustrated embodiment, nothing conceals the sensor 350.

The sensor 350 is not obstructive to the VVT mechanism 240 because the sensor 350 is disposed completely below the VVT mechanism 240. In other words, the VVT mechanism 240 can be disposed at a most preferred position without being obstructed by the sensor 350.

In addition, because of using a space between the VVT mechanism 240 and the fuel pump assembly 500, the positioning of the sensor 350 can contribute to make the outboard motor 30 more compact.

With reference to FIG. 5, the crankshaft angle position sensor 352 is associated with the crankshaft 118 to sense an angular position of the crankshaft 118 and sends a crankshaft angle position signal to the ECU 201 through the signal line. Any conventional crankshaft angle position sensors and any conventional arrangements thereof can be applied.

Both the camshaft angle position sensor 350 and the crankshaft angle position sensor 352 in the present system generate pulses as the respective signals. The pulse of the camshaft position sensor 350 can give an actual angular position of the camshaft 172. The crankshaft position signal together with the camshaft position signal allows the ECU 201 to accurately determine the position of the camshaft 172 in relation to the crankshaft 118.

With continued reference to FIG. 5, the throttle position sensor 354 preferably is disposed atop the valve shaft 154 to sense an angular position between the open and closed angular positions of the throttle valves 152 and sends a throttle valve position signal to the ECU 201 through the signal line.

The intake pressure sensor 356 preferably is disposed either within one of the intake passages 130 or within the plenum chamber 132 to sense an intake pressure therein. Because the respective intake passages 130 are formed such that each generally is the same size as the others, and because the plenum chamber 132 collects a large volume of air that is supplied to each of the intake passages 130, every passage 130 has substantially equal pressure and a signal of the intake pressure sensor 356 thus can represent a condition of the respective pressure. Thus, it should be appreciated that a single pressure sensor or multiple pressure sensors can be used.

The throttle valve position sensor 354 and the intake pressure sensor 356 preferably are selected from a type of sensor that indirectly senses an amount of air in the induction system. Another type of sensor that directly senses the air amount, of course, can be applicable. For example, moving vane types, heated wire types and Karman Vortex types of air flow meters also can be used.

The operator's torque request or engine load, as determined by the throttle opening degree, is sensed by the throttle position sensor 354. Generally, in proportion to the change of the throttle opening degree, the intake air pressure also varies and is sensed by the intake pressure sensor 356. The throttle valve 152 is opened when the operator operates the throttle lever to increase power output of the engine 32 and thus the speed of the watercraft 40. The intake pressure almost simultaneously decreases as the throttle valve 152 opens.

The engine load can also increase when the associated watercraft 40 is moving against wind. In this situation, the operator also operates the throttle lever to recover the speed that may be lost. Therefore, as used in this description, the term "acceleration" means not only the acceleration in the narrow sense but also the recovery of speed by the operator in a broad sense. Also, the term "sudden acceleration" means the sudden acceleration in the narrow sense and a quick recovery of speed by the operator in a broad sense.

The signal lines preferably are configured with hard-wires or wire-harnesses. The signals can be sent through emitter and detector pairs, infrared radiation, radio waves or the like. The type of signal and the type of connection can be varied between sensors or the same type can be used with all sensors that are described above and additional sensors described below.

Signals from other sensors or control signals also can be used for the control by the ECU 201. In the present control system, various sensors other than the sensors described above are also provided to sense the operational condition of the engine 32 and/or the outboard motor 30. For example, an oil pressure sensor 360, a water temperature sensor 362, an engine body temperature sensor 364, the knock sensor 353, an oxygen sensor 370 for determining a current air/fuel ratio, a transmission position sensor 372, a transmission position change operation sensor 374, and an intake air temperature sensor 376 are provided in the present control system. The sensors except for the transmission sensor 372 and the transmission position change operation sensor 374 can sense the operational conditions of the engine 32 and send signals to an operational state calculation unit 377 within the ECU 201 through respective sensor signal lines.

The transmission position sensor 372 senses whether the transmission 232 (FIG. 1) is placed at the forward, neutral or reverse position and sends a transmission position signal to the ECU 201 through the signal line. The transmission position change operation sensor 374 senses whether the transmission position change operation is conducted and sends a transmission position change operation signal to the ECU 201 through the signal line. An ignition control signal 378, a fuel injection control signal 380, and an AAD control signal 382 are also used by the ECU 201 for control of the spark plugs 203 (FIG. 2), the fuel injectors 198, and the AAD (not shown), respectively. The foregoing sensors

350–376 and the control signals 378–382, in a broad sense, define sensors 380 that sense operational conditions of the engine and/or the outboard motor.

The ECU 201 can be designed as a feedback control device using the signals of the sensors. The ECU 201 preferably has a central processing unit (CPU) and some storage units which store various control maps defining relationships between parameters such as, for example, the engine speed, the throttle valve position and the intake pressure (and/or an amount of intake air) to determine an optimum control conditions. The ECU 201 then controls the VVT mechanism 240, the fuel injectors 198 and other actuators in accordance with the determined control condition.

The fuel injection control unit 202 can be in the form of a hard-wired circuit, a dedicated processor and memory, or a general purpose processor and memory running one or a plurality of control programs. Other units, described below, can also be constructed as a hard-wired circuit, a dedicated processor and memory, or a general purpose processor and memory running one or a plurality of control programs. However, for easier understanding of the reader, the units will be described as if they were discriminate and substantial units. The illustrated fuel injection control unit 202 controls the fuel injectors 198 using at least the throttle position signal from the throttle position sensor 354 and the intake pressure signal from the intake pressure sensor 356.

The ECU 201 preferably comprises, other than the fuel injection control unit 202, an actual camshaft angular position calculation (ACAPC) unit 384, an engine speed calculation unit 386, a target camshaft angular position calculation (TCAPC) unit 388, and an OCV control value calculation unit 390.

The ACAPC unit 384 preferably receives the actual camshaft angular position signal from the camshaft angle position sensor 350 and the crankshaft angular position signal, which gives two possible ranges of camshaft angular position, from the crankshaft angle position sensor 352. The ACAPC unit 384 then calculates a deviation value which indicates how much the actual camshaft angular position deviates within the two possible ranges of camshaft angular position.

The engine speed calculation unit 386 receives the crankshaft angular position signal from the crankshaft angle position sensor 352 and calculates an engine speed using the signal versus time.

The TCAPC unit 388 receives the deviation value from the ACAPC unit 384, the engine speed from the engine speed calculation unit 386 and at least one of the throttle valve opening degree signal from the throttle valve position sensor 354 and the intake pressure signal from the intake pressure sensor 356. The TCAPC unit 388 then calculates a target camshaft angular position based upon the deviation value, the engine speed and either the throttle valve opening degree signal or the intake pressure signal.

The OCV control value calculation unit 390 receives the target camshaft angular position from the TCAPC unit 388 and calculates a control value of the OCV 314 of the VVT mechanism 40. That is, the OCV control value calculation unit 390 determines how much fluid should be delivered to either the space S1 or the space S2 of the adjusting section 242 of the VVT mechanism 40 based upon the target camshaft angular position.

The OCV 314 can also control the VVT mechanism 240 depending on information received from a knock condition calculation unit 394 and a knock control calculation unit 396. The information received from the knock sensor can allow the operation state calculation unit 377 to determine how to best control engine operation preventing engine knocking and promoting optimal engine performance. Preventing engine knocking and promoting optimal engine performance can be accomplished using VVT mechanism control as well as ignition timing control through an ignition timing calculation unit 398. The information received from the knock sensor 353 allows the ECU 201 to determine how best to promote the best possible engine performance and preventing knocking through a combination of VVT mechanism control and ignition timing control. The function of promoting engine performance and preventing knocking through the VVT mechanism and ignition timing is described in greater detail below.

Figure 6:
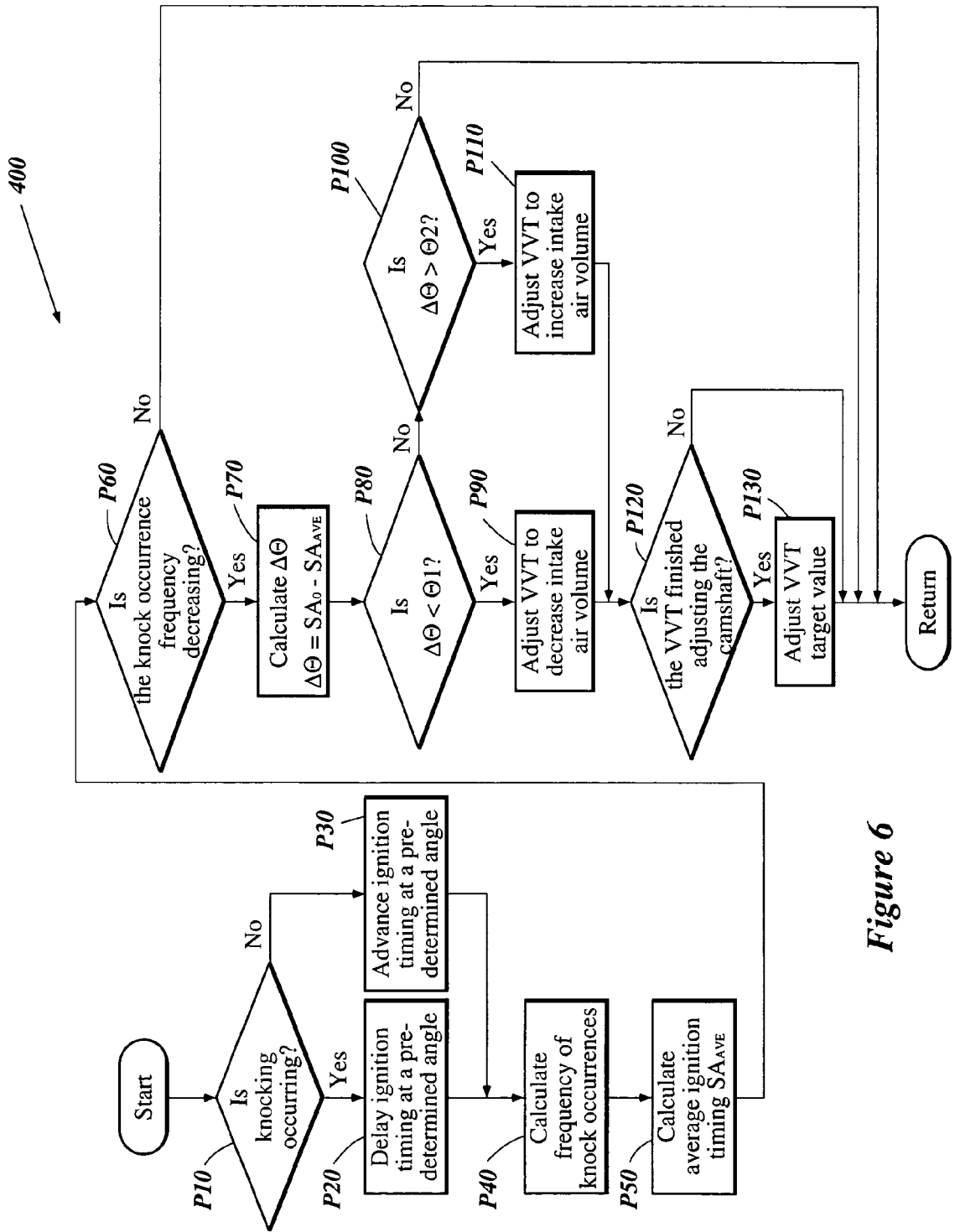
FIG. 6 is a block diagram showing a control routine arranged and configured in accordance with certain features, aspects, and advantages of the present embodiment.

With reference to FIG. 6, a control routine 400 is shown that is arranged and configured in accordance with certain features, aspects, and advantages of the present embodiment. The control routine 400 begins and moves to a first decision block P10 where it is determined if engine knocking is occurring.

If it is determined in decision block P10 that engine knocking is occurring, the control routine 400 proceeds to operation block P20. In operation block P20 the ignition timing is delayed at a predetermined angle. The operational state calculation unit 377 can determine the predetermined angle at which the ignition timing is delayed.

If, however, in decision block P10 it is determined that engine knocking is not occurring, the control routine 400 proceeds to an operation block P30. In operation block P30 the ignition timing is advanced at a predetermined angle. The operational state calculation unit 377 can determine the predetermined angle at which the ignition timing is advanced. The control routine 400 then proceeds to an operation block P40.

In operation block P40 the control routine 400 calculates the frequency of knock occurrences. The frequency of knock occurrences is determined by the intensity of the knock that occurs in the combustion chamber of the engine. A pre-ignition can be defined as a knock if the magnitude of pre-ignition is higher than a predetermined limit. The predetermined knock limit and how the ECU 201 reacts to a knock outside the predetermined limit is explained with reference to FIG. 7 below. The control routine 400 then proceeds to operation block P50.

In operation block P50 the control routine calculates an average ignition timing value SAave. The ignition timing value SAave represents an adjusted average ignition timing value that causes the detected knock to decrease to a value that is no longer harmful to the engine. The control routine 400 then proceeds to a decision block P60.

In decision block P60 it is determined if the knock occurrence frequency is decreasing. If, in decision block P60 the knock occurrence frequency is not decreasing, the control routine 400 returns to the beginning where detection of pre-ignition knocking as well as knock intensity is again initiated. If, however, in decision block P60 it is determined that the knock occurrence frequency is decreasing, the control routine proceeds to an operation block P70.

In operation block P70 the control routine 400 calculates a value $\Delta\theta$. $\Delta\theta$ equals $SA_0$—SAave. The ignition timing value $SA_0$ represents an ignition timing value equal to a predetermined reference ignition timing value as determined by the ECU 201. The control routine 400 then proceeds to a decision block P80.

In decision block P80 it is determined if $\Delta\theta$ is less than a predetermined ignition timing value $\Delta 1$. $\Delta 1$ can represent an ignition timing value that is a predetermined amount less than the predetermined referenced ignition timing value $SA_O$. If, in decision block P80, it is determined that $\Delta\theta$ is not less than $\Delta 1$, the control routine 400 proceeds to a decision block P100.

If, however, in decision block P80 it is determined that $\Delta\theta$ is less than $\Delta 1$, the control routine 400 proceeds to an operation block P90. In operation block P90 the control routine 400 adjusts the VVT to decrease the intake air volume entering the engine. The amount of air allowed into the engine by the VVT is directly related to the amount of fuel needed to create an air/fuel mixture that can be successfully combusted. The VVT can be compared to the throttle valve in that both devices can regulate the amount of air allowed into the engine to combine with the correct amount of fuel. Therefore, the less air allowed into the engine by the VVT mechanism is directly related to less fuel needed for successful combustion, so the amount of fuel needed and delivered to the fuel injectors 198 is reduced.

In decision block p100 it is determined if $\Delta\theta$ is greater than $\Delta 2$. $\Delta 2$ can represent an ignition timing value that is a predetermined amount greater than the optimal ignition timing value $SA_O$. If, in decision block P100 it is determined that $\Delta\theta$ is not greater than $\Delta 2$, the control routine returns.

If, however, in decision block P100 it is determined that $\Delta\theta$ is greater than $\Delta 2$, the control routine 400 proceeds to an operation block P 110. In decision block P110 the control routine adjusts the VVT to increase the intake air volume. The more air allowed into the engine by the VVT mechanism is directly related to more fuel needed for successful combustion, so the amount of fuel needed for successful combustion and delivered to the fuel injectors 198 is increased. The control routine then proceeds to a decision block P120.

In decision block P120 it is determined if the VVT has finished adjusting the camshaft to allow for more or less air to enter the engine. The VVT has finished adjusting the camshaft when the ECO 201 has determined that the amount of air being delivered to the engine is the correct amount of air needed for an optimal combustion without a knock occurring. If, in decision block P120 it is determined that the VVT has not finished adjusting the camshaft, the control routine 400 returns.

If, however, in decision block P120 it is determined that the VVT has finished adjusting the camshaft, the control routine proceeds to an operation block p130.

In operation block P130 the control routine adjusts the VVT target value. The target value can be an optimal value that determines in which direction the VVT mechanism adjusts the camshaft. The target value can be a value set by the ECU 201 depending on engine variables such as, but not limited to, ignition timing and knock occurrence. The control routine 400 then returns.

Figure 7:
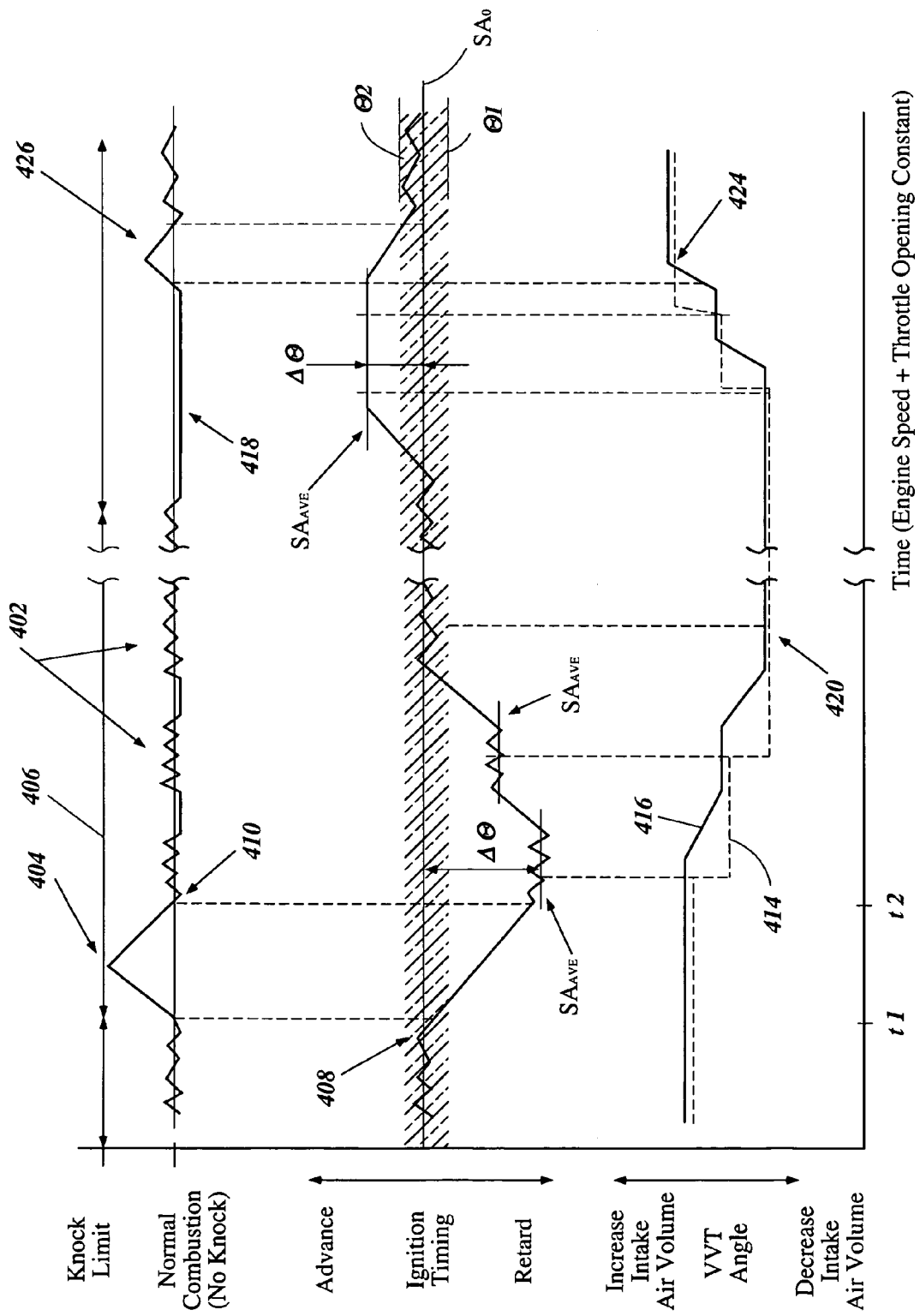
FIG. 7 is a graph diagram illustrating a pre-ignition signal, an ignition-timing signal, and a VVT camshaft angle signal.

FIG. 7 illustrates graphically how a knocking avoidance control system can operate. The knock sensor 353 continuously monitors the combustion of each cylinder of the engine 32. For example, the ECU 201 can sample the output of the knock sensor 353 at a predetermined timing. Small vibrations 402 are detected by the knock sensor 353. However, a possible damaging pre-ignition or "knock" is characteristically stronger than the inherent small engine vibrations 402 and is illustrated as a high point in FIG. 7, and is identified generally by the reference number 404. When the detected pre-ignition or knock 404 reaches a predetermined knock threshold 406, the ECU 201 begins retarding the ignition timing at a point 408 until normal combustion is resumed and pre-ignition detection is below the predetermined knock limit 406, for example at a point 410. $\Delta\theta$ is calculated after the calculated average ignition timing value SAave remains approximately constant for a predetermined amount of time. $\Delta\theta$ represents the difference between the predetermined reference ignition timing value $SA_O$ and the calculated average ignition timing value SAave.

After the ignition timing has been retarded due to the detected engine knock, the ECU 201 begins retarding the intake camshaft 172 through the VVT mechanism 240. The target camshaft angle calculation 388 determines a target camshaft angle value 414. The VVT mechanism 240 begins to adjust the camshaft 172 to an actual value 416 that follows the target camshaft angle value 414. The ECU 201 continues to retard the camshaft angle value and can simultaneously advance the ignition timing to a new calculated ignition timing value SAave.

Retarding the ignition timing provides a fast response to a detected engine knock; faster than retarding the camshaft angle value. Thus, the ignition is initially retarded to quickly inhibit engine damage due to knocking. Once the ignition value reaches a calculated ignition timing value SAave, the camshaft angle value is then retarded. Retarding both the ignition timing and retarding the camshaft angle value successfully prevents engine damage due to pre-ignition or knocking, however, retarding the camshaft angle value allows less air to enter the combustion chamber and therefore uses less fuel for complete combustion. Therefore, retarding the camshaft angle value inhibits engine damage due to pre-ignition and simultaneously increases fuel economy.

The ignition timing is advanced back to the predetermined reference ignition timing value $SA_O$ as the camshaft angle value continues to retard, thereby allowing the ignition timing to return toward a more optimal value, providing more efficient and cleaner combustion, while benefiting from the knock suppression provided by the retarded VVT mechanism 240 position. When no pre-ignition or knocking occurs, for example during a period of time 418, the ECU 201 begins to further advance the ignition timing. The camshaft angle value can remain in a retarded position 420 until the ignition timing value is advance at which point the camshaft angle value begins to advance to a predetermined value 424. The knocking avoidance control system can also react to a pre-ignition or knock 426 below the knock threshold 406 by again initially retarding the ignition timing and if needed retarding the camshaft angle value.

The above described knock avoidance control system can continuously advance the ignition timing and advance the camshaft angle value to increase engine performance until a pre-ignition is detected. After the ignition and camshaft angle value are retarded to inhibit engine damage when a pre-ignition or knock is detected, the knock avoidance control system can consistently advance the ignition timing and camshaft angle value to always provide the user with optimal engine performance and increased fuel economy.

Figure 8A:
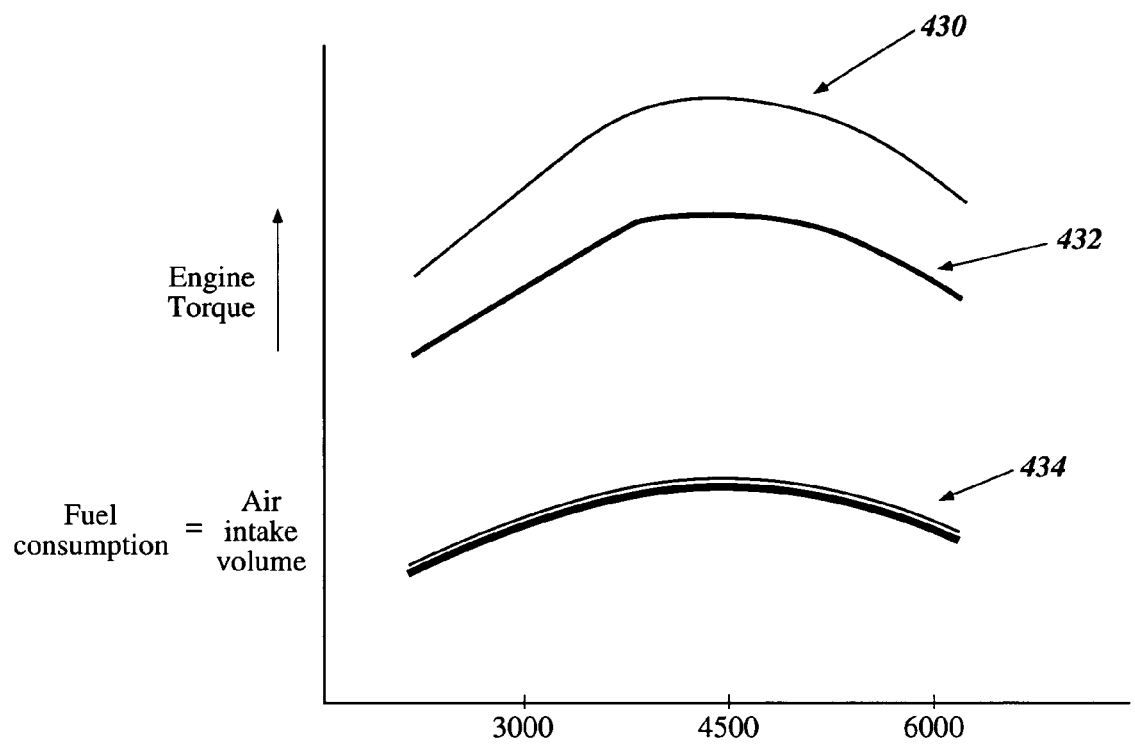
FIG. 8a is a graph diagram illustrating various engine torque curves and fuel consumption curves with reference to engine speed.
Figure 8B:
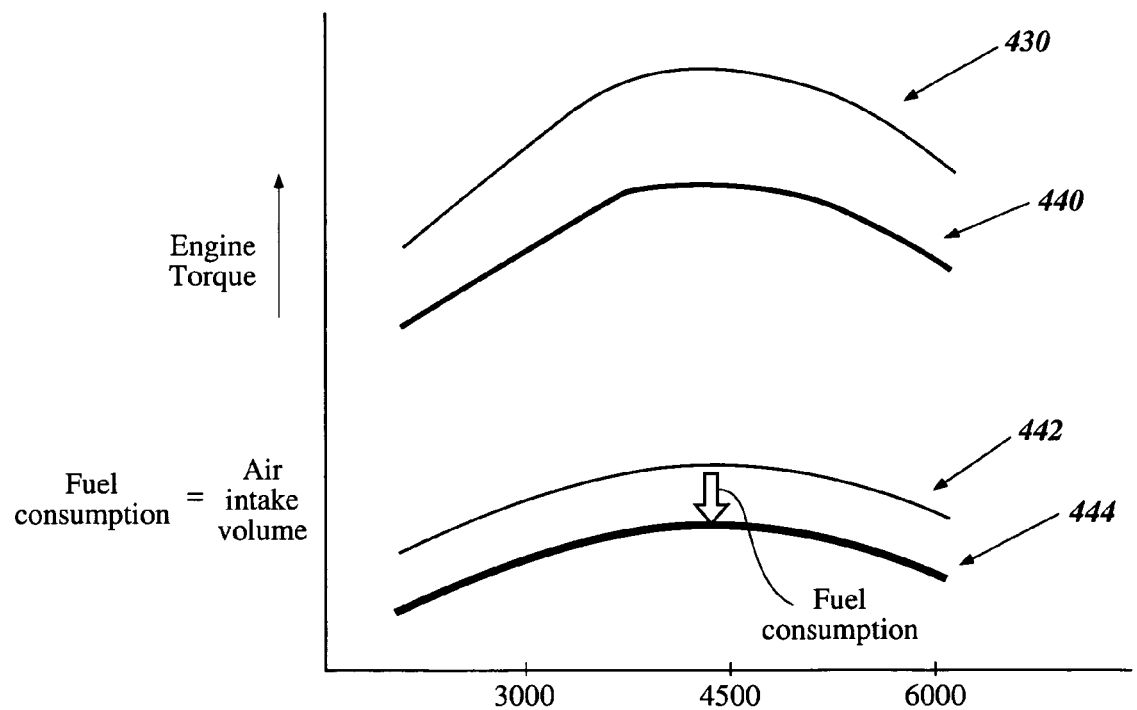
FIG. 8b is another graph diagram illustrating various engine torque curves and fuel consumption curves with reference to engine speed.

With reference to FIGS. 8a and 8b, two graphs are shown that illustrate a reduction in fuel consumption due to a preferred embodiment of the present invention. FIG. 8a illustrates engine parameters from an engine that uses only ignition timing to prevent engine damage due to pre-ignition or combustion knock. FIG. 8b illustrates engine parameters from an engine that uses both ignition timing and camshaft timing to prevent engine damage due to pre-ignition or combustion knock.

The top portion of FIG. 8a illustrates engine torque values with relation to engine speed for an optimal ignition timing value 430 and a retarded ignition timing value 432. As the ignition timing value is retarded due to pre-ignition or knock, the overall torque can decrease over the entire engine speed range. The lower portion of FIG. 8a illustrates a fuel consumption rate curve 434 that is identical over the entire engine speed range for retarded ignition timing values and for advanced ignition timing values when the camshaft angle value is not adjusted according to a knock detection.

The top portion of FIG. 8b illustrates engine torque values with relation to engine speed for an optimal ignition timing value 438 and a retarded ignition timing value 440. As the ignition timing value is retarded due to pre-ignition or knock, the overall torque is reduced over the entire engine speed range. The lower portion of FIG. 8b illustrates a fuel consumption rate curve 442 that corresponds to ignition timing values without camshaft angle value adjustment and a fuel consumption curve 444 that corresponds to adjusted ignition timing values combined with adjusted camshaft angle values. The fuel consumption is lower in the curve 444 because less fuel is used for combustion when less air is allowed in the cylinder by the VVT mechanism 240.

Figure 9A:
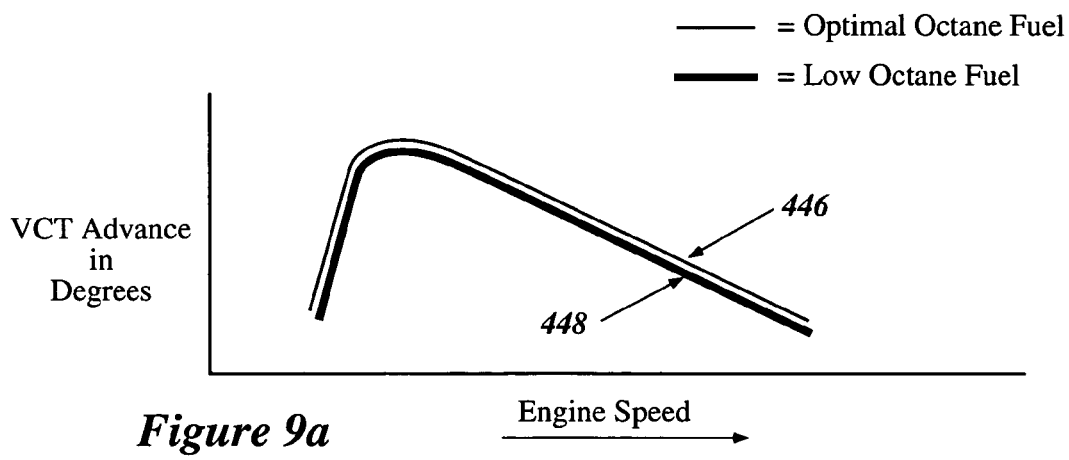
FIG. 9a is a graph diagram illustrating VVT camshaft angle curves for an optimal octane fuel and a low octane fuel with reference to engine speed.
Figure 9B:
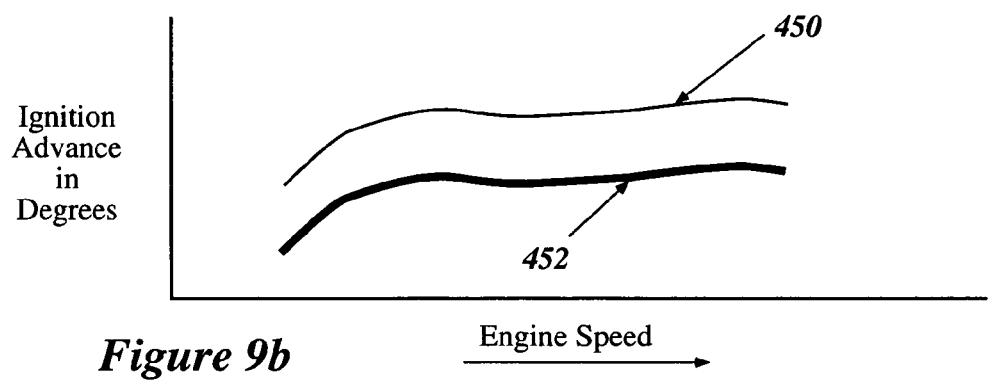
FIG. 9b is a graph diagram illustrating ignition curves for both an optimal octane fuel and a low octane fuel with reference to engine speed.

FIGS. 9a illustrates a VVT camshaft angle curve 446 for an optimal octane fuel and a curve 448 for a low octane fuel, both of which are set to allow the maximum amount of air into the cylinder of the engine. FIG. 9b illustrates an advanced ignition curve 450 using an optimal octane fuel and a retarded ignition curve 452 using a low octane fuel. The VVT camshaft angle curves 446, 448 of FIG. 9a and the two ignition timing curves 450, 452 of FIG. 9b are from an engine management system where the preferred embodiments are not applied.

The VVT camshaft angle curves 446, 448 of FIG. 9a are identical when the engine is being operated with an optimal octane fuel and a low octane fuel. The camshaft angle value is set at a value that allows the maximum amount of air into the cylinders. The ignition curve 452 of FIG. 9b shows a decrease in fuel economy when a low octane fuel is used by delaying ignition timing to prevent pre-ignition. Using the low octane fuel without VVT mechanism 240 lowers the fuel economy of the engine.

Figure 9C:
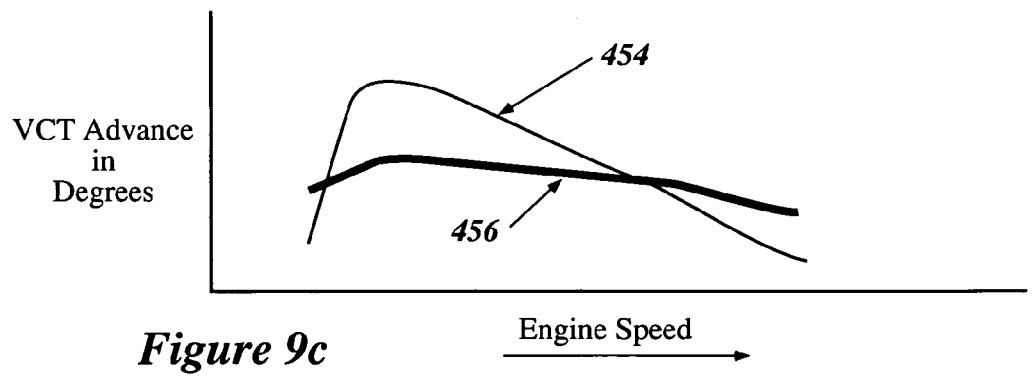
FIG. 9c is another graph diagram illustrating VVT camshaft angle curves for both optimal and low octane fuels with reference to engine speed.
Figure 9D:
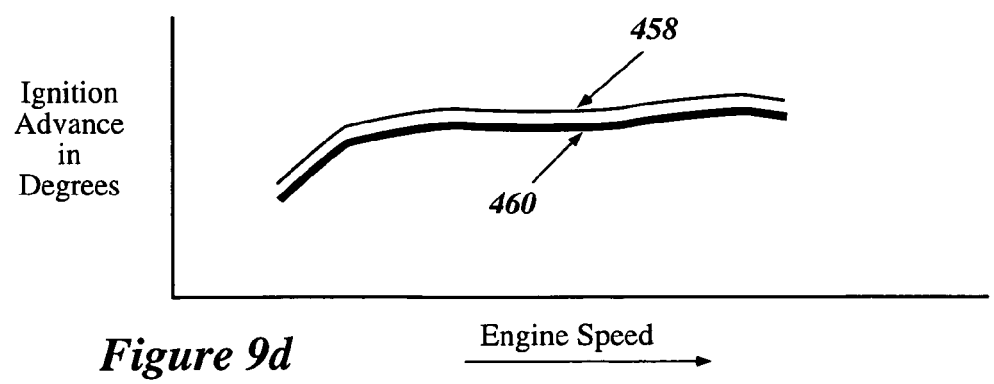
FIG. 9d is another graph diagram illustrating ignition curves for both an optimal octane fuel and a low octane fuel with reference to engine speed.

FIGS. 9c and 9d illustrate curves from an engine management system where the preferred embodiments are applied.

FIG. 9c illustrates a VVT camshaft angle curve 454 that is advanced to allow the maximum amount of air into the cylinders of the engine when using an optimal octane fuel. Another VVT camshaft angle curve 456 is a partially retarded VVT camshaft angle curve that decreases the amount of air allowed into the cylinders of the engine when a low octane fuel is used.

FIG. 9d illustrates an ignition curve 458 when the engine is operated with an optimal octane fuel and an ignition curve 460 when the engine is operated with a low octane fuel. The two ignition curves 458, 460 show identical high fuel economy because the engine is operated with the knock avoidance control system of the present invention. A combination of VVT camshaft angle value adjustment and ignition timing values provide a knock controlled engine with improved fuel economy and high torque.

Although this invention has been described in terms of certain preferred embodiments, other embodiments apparent to those of ordinary skill in the art are also within the scope of this invention. Accordingly, the scope of the present invention should be defined only by the appended claims.

What is claimed is:

1. A method for adjusting valve timing based on the existence of a pre-ignition vibration within an engine being controlled by an electronic control unit comprising a control module that is in electrical communication with a vibration sensor, the electronic control unit being adapted to control an ignition timing of an ignition source and to control a valve operation, the method comprising;
   sensing a vibration from a pre-ignition within the engine and determining when the vibration exceeds a first predetermined vibration value;
   adjusting the ignition timing to a predetermined first value until the vibration is reduced to a vibration value below the first predetermined value; and
   adjusting the valve operation following the adjustment of the ignition timing to maintain the vibration value at a value below the first predetermined value.

2. The method of claim 1, wherein adjusting the ignition timing comprises retarding the ignition timing, the method additionally comprising advancing the ignition timing in conjunction with adjusting the valve operation to maintain the vibration value at a value below the first predetermined value.

3. The method of claim 1, wherein adjusting the ignition timing comprises retarding the ignition timing to a first predetermined ignition timing value when the sensed vibration exceeds the first predetermined vibration value.

4. The method of claim 3, additionally comprising determining whether the vibration value has settled to a second predetermined value below the first predetermined value before advancing the ignition timing.

5. The method of claim 4, wherein adjusting the valve operation comprises adjusting the timing of the valve to reduce an amount of air combusted within the engine after the vibration value has settled to the second predetermined value.

6. The method of claim 5, additionally comprising advancing the ignition timing after the timing of the valve has been adjusted.

7. An internal combustion engine comprising: an engine body;
   a movable member movable relative to the engine body, the engine body and the movable member together defining a combustion chamber, the engine body defining intake and exhaust ports communicating with the combustion chamber;
   an air induction system communicating with the combustion chamber through the intake port;
   an exhaust system communicating with the combustion chamber through the exhaust port;
   an intake valve arranged to move between an open position and a closed position;
   an exhaust valve arranged to move between an open position and a closed position;
   a camshaft configured to actuate at least the intake valve;
   an ignition system configured to ignite a mixture of fuel and air in the combustion chamber;
   a pre-ignition sensor configured to sense a pre-ignition in the combustion chamber;
   a change mechanism arranged to change an angular position of the camshaft; and
   a control system configured to adjust timing of the ignition system and to control the change mechanism to change the angular position of the camshaft according to a sensed pre-ignition following retardation of ignition timing.

8. The engine as set forth in claim 7, wherein the control system is configured to retard the ignition timing according to a sensed pre-ignition until the pre-ignition is reduced to a first value.

9. The engine as set forth in claim 7, wherein the control system is configured to begin to change the angular position of the camshaft to reduce an amount of air flowing through the induction system after the ignition timing has been retarded.

10. The engine as set forth in claim 7, wherein the control system is configured to advance the ignition timing while the angular position of the camshaft is adjusted.

11. An internal combustion engine comprising: an engine body;
- a movable member movable relative to the engine body, the engine body and the movable member together defining a combustion chamber;
- a controller configured to control an ignition timing of an ignition source and to control a valve operation to reduce an amount of air delivered into the combustion chamber following retardation of ignition timing;
- means for sensing a vibration from a pre-ignition and determining when the vibration exceeds a predetermined vibration level;
- means for retarding the ignition timing to a predetermined value to reduce the vibration;
- means for adjusting the valve operation to reduce a quantity of air flowing into the engine body when the vibration exceeds the predetermined level; and
- means for advancing the ignition timing when the valve operation is adjusted to reduce the quantity of air.

12. The internal combustion engine of claim 11 additionally comprising means for determining when the vibration level settles below a predetermined vibration level, wherein the means for adjusting the valve operation waits until the vibration level settles below the predetermined vibration level before reducing the quantity of air.

* * * * *

UNITED STATES PATENT AND TRADEMARK OFFICE
CERTIFICATE OF CORRECTION

PATENT NO. : 6,971,360 B2  Page 1 of 1
APPLICATION NO. : 10/715320
DATED : December 6, 2005
INVENTOR(S) : Katayama It is certified that error appears in the above-identified patent and that said Letters Patent is hereby corrected as shown below:

Column 2,
Line 9, after "speeds" delete ",".

Column 5,
Line 57, delete "FIG. 2 and 3" and insert -- FIGS. 2 and 3 --.

Column 6,
Line 16, before "moveable" insert -- A --.

Column 13,
Line 43, delete "Arod" and insert -- A rod --.

Column 16,
Line 4, delete "should-be" and insert -- should be --.

Column 19,
Line 26, delete "P 110" and insert -- P110 --.
Line 45, delete "p130" and insert -- P130 --.

Column 21,
Line 20, delete "FIGS. 9a" and insert -- FIG. 9a --.

Column 22,
Line 2, after "comprising" delete ";" and insert -- : --.

Signed and Sealed this

Eleventh Day of July, 2006

JON W. DUDAS
*Director of the United States Patent and Trademark Office*